United States Patent Office 2,815,249
Patented Dec. 3, 1957

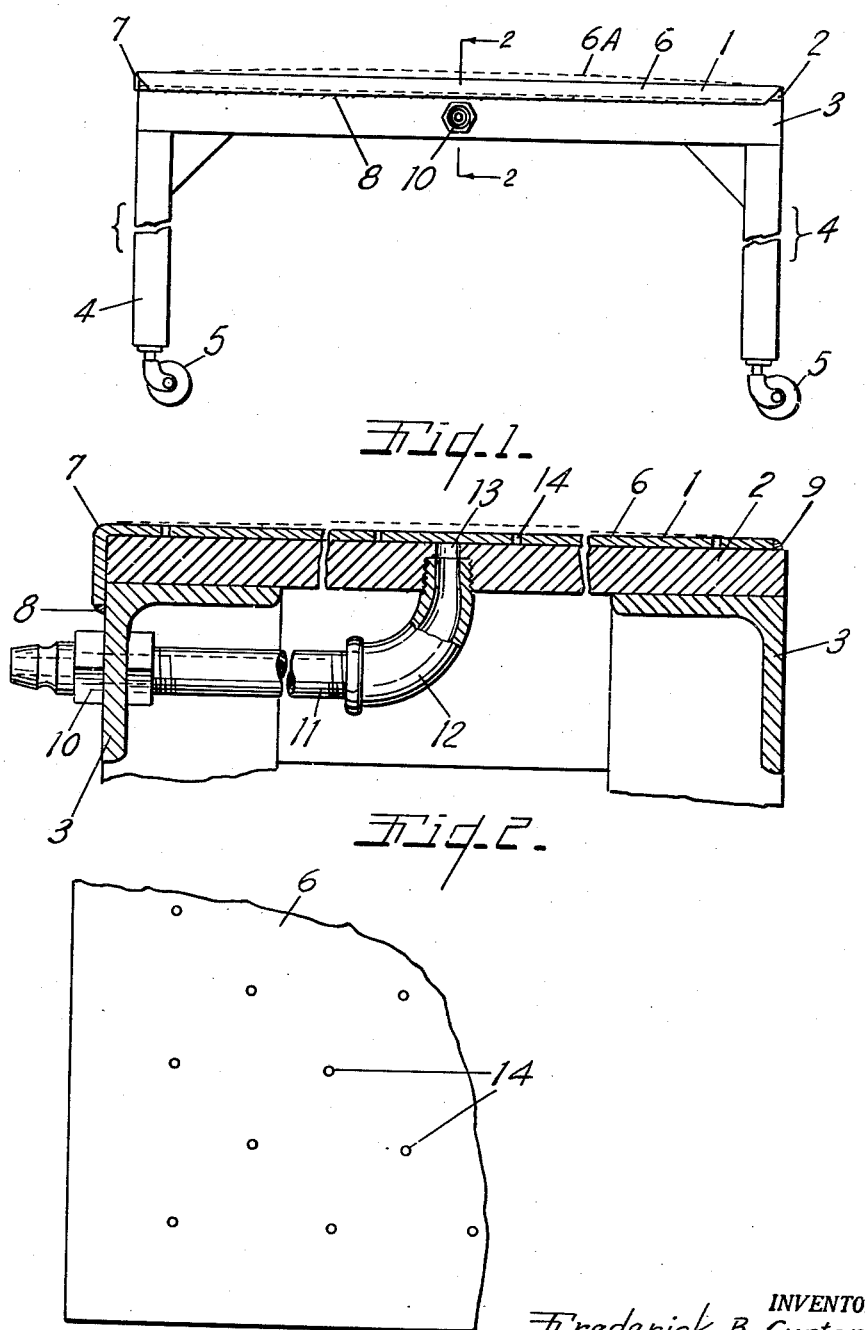

2,815,249
AIR FILM TABLE

Frederick B. Curtenius, Kalamazoo, Mich.

Application August 17, 1955, Serial No. 529,007

9 Claims. (Cl. 302—29)

This invention relates to improvements in air film table. The principal objects of the invention are:

First, an inexpensive table or platform for supporting stacks of paper or other articles with means for discharging air under pressure through the surface of the table to facilitate sliding or moving the stacks or articles on the table.

Second, to provide an air film table that does not require expensive valves or air controlling fixtures.

Third, to provide an air film table that does not require expensively formed air conducting channels and grooves to distribute the air.

Fourth, to provide an air film table in which the air distributing header is formed by a single flexible sheet of metal which also forms the surface of the table and has the air discharge ports formed therethrough.

Air film tables or platforms have been used for some time to facilitate sliding articles, particularly heavy stacks of paper over supporting surfaces. The present invention can be applied to any air film platform and may be fixed, portable or mobile. It may be of any height, size or strength to handle articles of different weight in different circumstances.

The example of the invention illustrating the table consists of a top generally indicated at 1. The top may consist of a flat panel 2 suitably reinforced by a sub-frame 3 as illustrated, or the table panel may be of sufficient strength and thickness to support the load without reinforcement. The top is supported on legs 4 and castor wheels 5 are provided when the table is to be mobile. The table panel 2 is flat and smooth but metal plate as rolled and flattened is usually flat and smooth enough without further finishing or grinding. Minor irregularities or corrections in the top panel will not destroy its usefulness.

Lapped on top of the table panel 2 is a sheet metal cover plate 6. The plate 6 is of the order of 16 gage and is polished on its upper surface to be very smooth. The cover plate is attached at its edges to the edge of the top 1 but is otherwise freely supported on the top panel and unconnected thereto over the interior of the plate and panel. One or more edges of the top plate are folded over the edge of the top panel in smoothly rounded edges 7 and welded to the sides of the table top as at 8. Other edges terminate just short of the edge of the top panel and are welded thereto as at 9. The rounded edges 7 facilitate sliding objects off the table where such action is desired. The welds 9 may form a rough edge that obstructs sliding objects off the table unless the welds are carefully ground.

The welds 8 and 9 form an air tight seal all around the top plate and create a very thin air space or chamber between the top panel and top plate. Part of the table top 1 such as the frame 3 carries a coupling fixture 10 for an air supply hose. The coupling fixture is connected by a tube 11 to a fixture 12 threaded into a hole 13 in the top panel. The coupling 10 is thus arranged to admit compressed air into the thin chamber between the top panel 2 and top cover plate 6. Where, as in the example illustrated, the table is to be mobile the coupling 10 is of the quick release type.

The cover plate 6 is drilled to form a plurality of ports 14 distributed over the top area of the cover plate. The ports may be varied in size and spacing to function under different condition but for handling heavy stacks of paper sheets ports about $\frac{1}{32}$ inch in size positioned at 6 inch spacing have proved very satisfactory when the coupling 10 is supplied with air at 5 to 10 pounds pressure. When the air pressure is turned on the cover plate 6 bows upwardly as is shown to an exaggerated degree by the dotted lines at 6A. This not only slightly crowns the cover plate to facilitate sliding objects thereon but it also widens the chamber under the cover plate and admits air to all the ports 14. Air escaping from the ports 14 acts in the familiar manner of old air tables to create an air film under objects on the table and reduce friction between the object and the table.

Having thus described the invention, what is claimed as new and is desired to be secured by Letters Patent is:

1. An air table comprising a flat top panel, legs with castor wheels supporting said panel, a metal cover plate having a polished upper surface and having its mid-portion unconnectedly supported on said panel, the periphery of said plate being mechanically connected and sealed to said panel, part of the edges of the plate being folded in smoothly rounded edges over the edges of the panel and welded at the side of the table, part of the edges of the plate being welded to the top of the panel and means including a quick release coupling on said panel arranged to admit air under pressure to between said plate and said panel, said plate having a plurality of constantly open ports formed therethrough and distributed thereover, said plate being movable away from the underlapped portion of said panel under the influence of air pressure and within the limits of flexibility of the plate to form an air distributing chamber between the plate and panel.

2. An air table comprising a flat top panel, legs supporting said panel, a metal cover plate having a polished upper surface and having its mid-portion unconnectedly supported on said panel, the periphery of said plate being mechanically connected and sealed to said panel, part of the edges of the plate being folded in smoothly rounded edges over the edge of the panel and welded at the side of the table, part of the edges of the plate being welded to the top of the panel and means including a coupling on said panel arranged to admit air under pressure to between said plate and said panel, said plate having a plurality of constantly open ports formed therethrough and distributed thereover, said plate being movable away from the underlapped portion of said panel under the influence of air pressure and within the limits of flexibility of the plate to form an air distributing chamber between the plate and panel.

3. An air table comprising a flat top panel, legs with castor wheels supporting said panel, a metal cover plate having a smooth upper surface and having its mid-portion unconnectedly supported on said panel, the periphery of said plate being mechanically connected and sealed to said panel, part of the edges of the plate being folded in smoothly rounded edges over the edge of the panel and welded at the side of the table, and means including a quick release coupling on said panel arranged to admit air under pressure to between said plate and said panel, said plate having a plurality of constantly open ports formed therethrough and distributed thereover, said plate being movable away from the underlapped portion of said panel under the influence of air pressure and within the limits of flexibility of the plate to form an air distributing chamber between the plate and panel.

4. An air table comprising a flat top panel, legs with castor wheels supporting said panel, a metal cover plate having a smooth upper surface and having its mid-portion unconnectedly supported on said panel, the periphery of said plate being mechanically connected and sealed to said panel, and means including a quick release coupling arranged to admit air under pressure to between said plate and said panel, said plate having a plurality of constantly open ports formed therethrough and distributed thereover, said plate being movable away from the underlapped portion of said panel under the influence of air pressure and within the limits of flexibility of the plate to form an air distributing chamber between the plate and panel.

5. An air table comprising a flat support panel, a metal cover plate having a smooth upper surface and having its mid-portion unconnectedly supported on said panel, the periphery of said plate being mechanically connected and sealed to said panel, part of the edges of the plate being folded in smoothly rounded edges over the edge of the panel and welded at the side of the table, and means including a coupling on said panel arranged to admit air under pressure to between said plate and said panel, said plate having a plurality of constantly open ports formed therethrough and distributed thereover, said plate being movable away from the underlapped portion of said panel under the influence of air pressure and within the limits of flexibility of the plate to form an air distributing chamber between the plate and panel.

6. An air table comprising a flat support panel, a metal cover plate having a smooth upper surface and having its mid-portion unconnectedly supported on said panel, the periphery of said plate being mechanically connected and sealed to said panel, and means to admit air under pressure between said plate and said panel, said plate having a plurality of constantly open ports formed therethrough and distributed thereover, said plate being movable away from the underlapped portion of said panel under the influence of air pressure and within the limits of flexibility of the plate to form an air distributing chamber between the plate and panel.

7. An air table comprising a smooth surfaced stiff sheet of impervious material having a plurality of air jet ports formed therethrough and distributed thereover, a support freely supporting the mid-portion of said sheet and coacting therewith to form a thin expansible air space therebetween, means for admitting air under pressure to said air space, and means connecting the edges of said sheet to said support and closing the sides of said air space, said sheet having sufficient elasticity and strength to contain air under pressure in said space by bowing upwardly from said support.

8. An air table comprising a pair of flat plates of impervious material arranged in lapped normally contacting relation, one of said plates constituting a load sustaining member, said other of said plates being of substantially thinner gage than said load sustaining plate and having sufficient flexibility to deflect away from said one plate, said plates being unconnected over a major portion of their central area, means sealing the peripheries of said plates together around said central area, means connected to one of said plates for admitting air under pressure to the lapped surfaces of said plates within the outline of said sealing means for deflecting said other of said plates, and means supporting said plates, the uppermost of said plates having a plurality of small holes therein distributed over said central area.

9. An air table comprising a pair of flat plates of impervious material arranged in lapped normally contacting relation, one of said plates constituting a load sustaining member, said plates being unconnected over a major portion of their central area, means sealing said plates together around siad central area, means connected to one of said plates for admitting air under pressure to the lapped surfaces of said plates within the outline of said sealing means, and means supporting said plates, the uppermost of said plates having a plurality of small holes therein distributed over said central area, one of said plates having sufficient flexibility to deflect away from the other along said central area under the influence of air pressure on said area to form an air distributing chamber.

References Cited in the file of this patent

UNITED STATES PATENTS

| | | |
|---|---|---|
| 1,759,983 | Houston | May 27, 1930 |
| 2,315,627 | Lamb | Apr. 6, 1943 |